US011442823B2

(12) United States Patent
Bourbonnais et al.

(10) Patent No.: US 11,442,823 B2
(45) Date of Patent: Sep. 13, 2022

(54) TRANSACTION CONSISTENCY QUERY SUPPORT FOR REPLICATED DATA FROM RECOVERY LOG TO EXTERNAL DATA STORES

(71) Applicant: International Business Machines Corporation, Armonk, NY (US)

(72) Inventors: Serge Bourbonnais, Palo Alto, CA (US); Austin F. M. D'Costa, Beaverton, OR (US); Yat On Lau, San Jose, CA (US); Xiao Li, San Jose, CA (US); Hong Min, Poughkeepsie, NY (US); Gong Su, New York, NY (US); Jonathan W. Wierenga, Lower Hutt (NZ); Christian Zentgraf, Columbus, OH (US); Kan Zhang, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 718 days.

(21) Appl. No.: 15/173,502

(22) Filed: Jun. 3, 2016

(65) Prior Publication Data
US 2017/0351585 A1 Dec. 7, 2017

(51) Int. Cl.
G06F 11/14 (2006.01)
G06F 16/27 (2019.01)

(52) U.S. Cl.
CPC .......... *G06F 11/1474* (2013.01); *G06F 16/27* (2019.01)

(58) Field of Classification Search
None
See application file for complete search history.

(56) References Cited

U.S. PATENT DOCUMENTS 5,553,279 A * 9/1996 Goldring ............. G06F 11/1471
707/615
5,870,761 A 2/1999 Demers et al.
(Continued)

OTHER PUBLICATIONS

List of IBM Patents or Patent Applications Treated as Related, Dec. 21, 2017, Total 2 pp.

(Continued)

*Primary Examiner* — Ashish Thomas
*Assistant Examiner* — Mellissa M. Ohba
(74) *Attorney, Agent, or Firm* — Konrad Raynes Davda & Victor LLP; Janaki K. Davda

(57) ABSTRACT

Transaction consistency query support is available for replicated data from recovery log to external data stores. An external data store is populated with records using entries of a change data table. The change data table has entries for each transaction that has committed and is to be replicated, and each of the entries stores information for each log entry in a recovery log from a database management system. Each log entry identifies a transactional change of data and a transaction completion indicator of one of commit and abort. In response to receiving a query about a transaction of the transactions, a set of records are retrieved from the external data store for the transaction. From the set of records, records whose sequence identifier values are larger than a maximum transaction commit sequence identifier are removed. From the set of records, remaining records having transaction consistency are returned.

12 Claims, 10 Drawing Sheets

(56) References Cited

U.S. PATENT DOCUMENTS

| | | | | |
|---|---|---|---|---|
| 5,956,704 | A * | 9/1999 | Gautam | G06F 16/2379 |
| 6,622,152 | B1 | 9/2003 | Sinn et al. | |
| 6,804,672 | B1 | 10/2004 | Klein et al. | |
| 6,978,396 | B2 | 12/2005 | Ruuth et al. | |
| 7,076,508 | B2 * | 7/2006 | Bourbonnais | G06F 17/30377 |
| 7,406,486 | B1 | 7/2008 | Kundu et al. | |
| 7,457,796 | B2 | 11/2008 | Lashley et al. | |
| 7,490,083 | B2 | 2/2009 | Bourbonnais et al. | |
| 7,716,181 | B2 * | 5/2010 | Todd | G06F 17/30578 |
| | | | | 707/635 |
| 8,032,488 | B2 | 10/2011 | Lashley et al. | |
| 8,032,885 | B2 | 10/2011 | Fish | |
| 8,150,812 | B2 * | 4/2012 | Todd | G06F 16/273 |
| | | | | 707/662 |
| 8,296,269 | B2 * | 10/2012 | Pareek | G06F 17/30368 |
| | | | | 707/672 |
| 8,341,134 | B2 * | 12/2012 | Bourbonnais | G06F 17/30578 |
| | | | | 707/703 |
| 8,473,953 | B2 | 6/2013 | Bourbonnais et al. | |
| 8,650,155 | B2 | 2/2014 | Corbin et al. | |
| 8,738,568 | B2 | 5/2014 | Ghosh et al. | |
| 8,843,441 | B1 * | 9/2014 | Rath | G06F 16/273 |
| | | | | 707/614 |
| 9,280,591 | B1 * | 3/2016 | Kharatishvili | G06F 16/27 |
| 9,444,811 | B2 * | 9/2016 | Nara | H04L 67/1095 |
| 10,009,438 | B2 * | 6/2018 | Das | G06F 11/3072 |
| 2003/0172091 | A1 * | 9/2003 | Norcott | G06F 16/2358 |
| 2004/0199552 | A1 | 10/2004 | Ward et al. | |
| 2008/0281865 | A1 * | 11/2008 | Price | G06F 16/2343 |
| 2012/0084260 | A1 * | 4/2012 | Cherkauer | G06F 11/2094 |
| | | | | 707/648 |
| 2012/0150829 | A1 * | 6/2012 | Bourbonnais | G06F 17/30578 |
| | | | | 707/703 |
| 2012/0166407 | A1 * | 6/2012 | Lee | G06F 9/466 |
| | | | | 707/703 |
| 2012/0167098 | A1 * | 6/2012 | Lee | G06F 16/2379 |
| | | | | 718/101 |
| 2012/0191680 | A1 * | 7/2012 | Bourbonnais | G06F 17/30578 |
| | | | | 707/703 |
| 2013/0073513 | A1 | 3/2013 | Kemper et al. | |
| 2015/0199415 | A1 | 7/2015 | Bourbonnais et al. | |
| 2015/0254298 | A1 | 9/2015 | Bourbonnais et al. | |

OTHER PUBLICATIONS

Preliminary Amendment, Dec. 21, 2017, for U.S. Appl. No. 15/850,454, filed Dec. 21, 2017 by S. Bourbonnais et al., Total 5 pp.

U.S. Appl. No. 15/850,454, filed Dec. 21, 2017, entitled "Transaction Consistency Query Support for Replicated Data From Recovery Log to External Data Stores", invented by S. Bourbonnais, Total 43 pp.

Cecchet, E., G. Candea, and A. Ailamaki, "Middleware-based Database Replication: The Gaps Between Theory and Practice", SIGMOD'08, Jun. 9-12, 2008, Copyright 2008 ACM, Total 14 pp.

Gray, J., P. Helland, P. O'Neil, and D. Shasha, "The Dangers of Replication and a Solution", 1996, ACM SIGMOD, p. 173-182., Total 10 pp.

IP.com, "Methodology for Intelligent Recovery Model for System with Missing/Corrupted Transactional Log Files", IP.com No. 000239860, can be retrieved at <URL: IP.com No. 000239860>, Dec. 5, 2014, Total 6 pp.

Kemme, B., R.J. Peris, and M. Patino-Martinez, "Database Replication: Synthesis Lectures on Data Management", Copyright © 2010 by Morgan & Claypool, Total 154 pp.

Min, H., Z. Gao, X. Li, J. Huang, Y. Jin, S. Bourbonnais, M. Zheng, and G. Fuh, "Inter-Data-Center Large-scale Database Replication Optimization—a Workload Driven Partitioning Approach", 25th International Conference on Database and Expert Systems Applications (DEXA) 2014: 417-432, Total 15 pp.

Kim, W., W. Kelley, S. Gala, and I. Choi, "SQL/M: A Unified Relational and Object-Oriented Multidatabase Language"; Journal of Computer and Software Engineering, vol. 3, No. 1, pp. 71-99; 1995, Total 15 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

Traiger, I.L., J.N. Gray, C.A. Galtieri, B.G. Lindsay, "Transactions and Consistency in Distributed Database Systems", Jun. 5, 1979, IP.com No. 000148821, can be retrieved at <URL: http://ip.com/IPCOM/000148821>, Total 21 pp.

Office Action 1 for U.S. Appl. No. 15/850,454, pp. 22, dated Oct. 4, 2018.

Response to Office Action 1 for U.S. Appl. No. 15/850,454, pp. 18, dated Jan. 4, 2019.

Final Office Action 1 for U.S. Appl. No. 15/850,454, pp. 19, dated Jun. 10, 2019.

Response to Final Office Action 1 for U.S. Appl. No. 15/850,454, pp. 7, dated Aug. 22, 2019.

Office Action 3 for U.S. Appl. No. 15/850,454, 18 pp, dated Dec. 13, 2019.

Response to Office Action 3 for U.S. Appl. No. 15/850,454, 10 pp, dated Mar. 13, 2020.

Final Office Action 2 for U.S. Appl. No. 15/850,454, pp. 19, dated Jun. 19, 2020.

Response to Final Office Action 1 for U.S. Appl. No. 15/850,454, pp. 11, dated Sep. 15, 2020.

Office Action 5 for U.S. Appl. No. 15/850,454, pp. 18, dated Jun. 10, 2021.

Response to Office Action 5 for U.S. Appl. No. 15/850,454, pp. 9, dated Sep. 10, 2021.

Supplemental Amendment dated Jun. 30, 2022, pp. 7, for U.S. Appl. No. 15/850,454.

Notice of Allowance dated Jul. 27, 2022, pp. 19, for U.S. Appl. No. 15/850,454.

* cited by examiner

TRANSACTION CONSISTENCY QUERY SUPPORT FOR REPLICATED DATA FROM RECOVERY LOG TO EXTERNAL DATA STORES

FIELD

Embodiments of the invention relate to transaction consistency query support for replicated data from recovery log to external data stores.

BACKGROUND

Transactions include Create, Read, Update, and Delete (CRUD) operations. A transaction's writeset refers to data being operated with CRUD operations. Parallel replication replicates (copies) data from a source data store (e.g., a source DataBase Management System (DBMS)) to target data stores via multiple logical end-to-end replication channels.

Parallel replication is a desirable solution to increase throughput by concurrently replicating changed data through these replication channels. Such concurrent replication may potentially split a transaction's writeset among the multiple replication channels.

For such a split transaction's writeset, the existing solutions are unable to recover transaction consistency when answering queries at the target data stores. For example, assume that transactions for a bank account that stores $500 includes: a deposit of $500 and a withdrawal of $1000. Once the deposit is made, the bank account stores $1000, and the withdrawal of $1000 is valid. However, if the withdrawal is processed before the deposit, then the withdrawal fails (as there is $500 in the account). To maintain transaction consistency, the order of the transactions must be maintained at the target data stores, i.e. in above example, the deposit needs to occur before the withdrawal at the target data store, the same as at the source data store Designs of asynchronous/lazy database replication face a challenge of performance. The applications that changed the data in the source database (e.g., insert/update/delete) may have had many simultaneous transactions active and working in parallel. The replication system may be serialized for assuring that the original order remains intact, but in doing so, gives up much of the parallelism and performance of the source system, resulting in stale data in the target system.

For performance reasons, the transactions are applied in parallel, independent threads. If a transaction message has a dependency on one or more preceding transaction messages whose applications have not yet completed, that transaction message is held until the application completes. To find the transaction dependencies at low granularity levels, there are two solutions.

With solution 1, using the transactions' start and commit time values, the replication engines can determine the commit sequences of these transactions at the source side. The transactions can be issued in parallel as long as their commit sequences are the same. Thus, transaction dependencies can be built based on their associated commit time values.

With solution 2, using the raw column values and operation types of each row change, the replication engines can dynamically determine if these transactions are trying to change the same records. If a pair of transactions includes operations that modify the same records, then the transactions must be serialized. A global transaction dependency graph can be built using these row-level local relations. Solution 2 offers better parallelism than Solution 1, but Solution 2 only guarantees casual consistency of these Insert/Delete/Update operations. That is, the performance improvement is achieved by relaxing the original transactional consistency.

Unfortunately, when the workloads are very heavy, the replication throughputs of the above two solutions are still unable to match the source-side workload throughputs. Therefore, for further performance enhancement, a replication system may further relax the consistency, for example, by breaking up the workload of the transaction stream by tables or even finer granularity. In this case, it violates transaction consistency, which is guaranteed in the source-side database. Although most of such solutions can guarantee eventual consistency, target-side replicas become dirty and inconsistent when replicating. The data in these replicas are not acceptable for most business-critical applications, especially in scenarios of 24/7/365 replication services.

SUMMARY

Provided is a method for transaction consistency query support for replicated data from recovery log to external data stores. An external data store is populated, using a processor of a computer, with records using entries of a change data table. The change data table has entries for each transaction that has committed and is to be replicated, and each of the entries stores information for each log entry in a recovery log from a database management system. Each log entry identifies a transactional change of data and a transaction completion indicator of one of commit and abort. In response to receiving a query about a transaction of the transactions, a set of records are retrieved from the external data store for the transaction. From the set of records, records whose sequence identifier values are larger than a maximum transaction commit sequence identifier are removed. From the set of records, remaining records having transaction consistency are returned.

Provided is a computer program product for transaction consistency query support for replicated data from recovery log to external data stores. The computer program product comprises a computer readable storage medium having program code embodied therewith, the program code executable by at least one processor. With the computer program product, an external data store is populated with records using entries of a change data table. The change data table has entries for each transaction that has committed and is to be replicated, and each of the entries stores information for each log entry in a recovery log from a database management system. Each log entry identifies a transactional change of data and a transaction completion indicator of one of commit and abort. In response to receiving a query about a transaction of the transactions, a set of records are retrieved from the external data store for the transaction. From the set of records, records whose sequence identifier values are larger than a maximum transaction commit sequence identifier are removed. From the set of records, remaining records having transaction consistency are returned.

Provided is a computer system for transaction consistency query support for replicated data from recovery log to external data stores. The computer system comprises one or more processors, one or more computer-readable memories and one or more computer-readable, tangible storage devices and comprises program instructions, stored on at least one of the one or more computer-readable, tangible storage devices for execution by at least one of the one or more processors via at least one of the one or more memories. With the computer system, an external data store is populated with records using entries of a change data table. The change data table has entries for each transaction that has committed and is to be replicated, and each of the entries stores information for each log entry in a recovery log from a database management system. Each log entry identifies a transactional change of data and a transaction completion indicator of one of commit and abort. In response to receiving a query about a transaction of the transactions, a set of records are retrieved from the external data store for the transaction. From the set of records, records whose sequence identifier values are larger than a maximum transaction commit sequence identifier are removed. From the set of records, remaining records having transaction consistency are returned.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
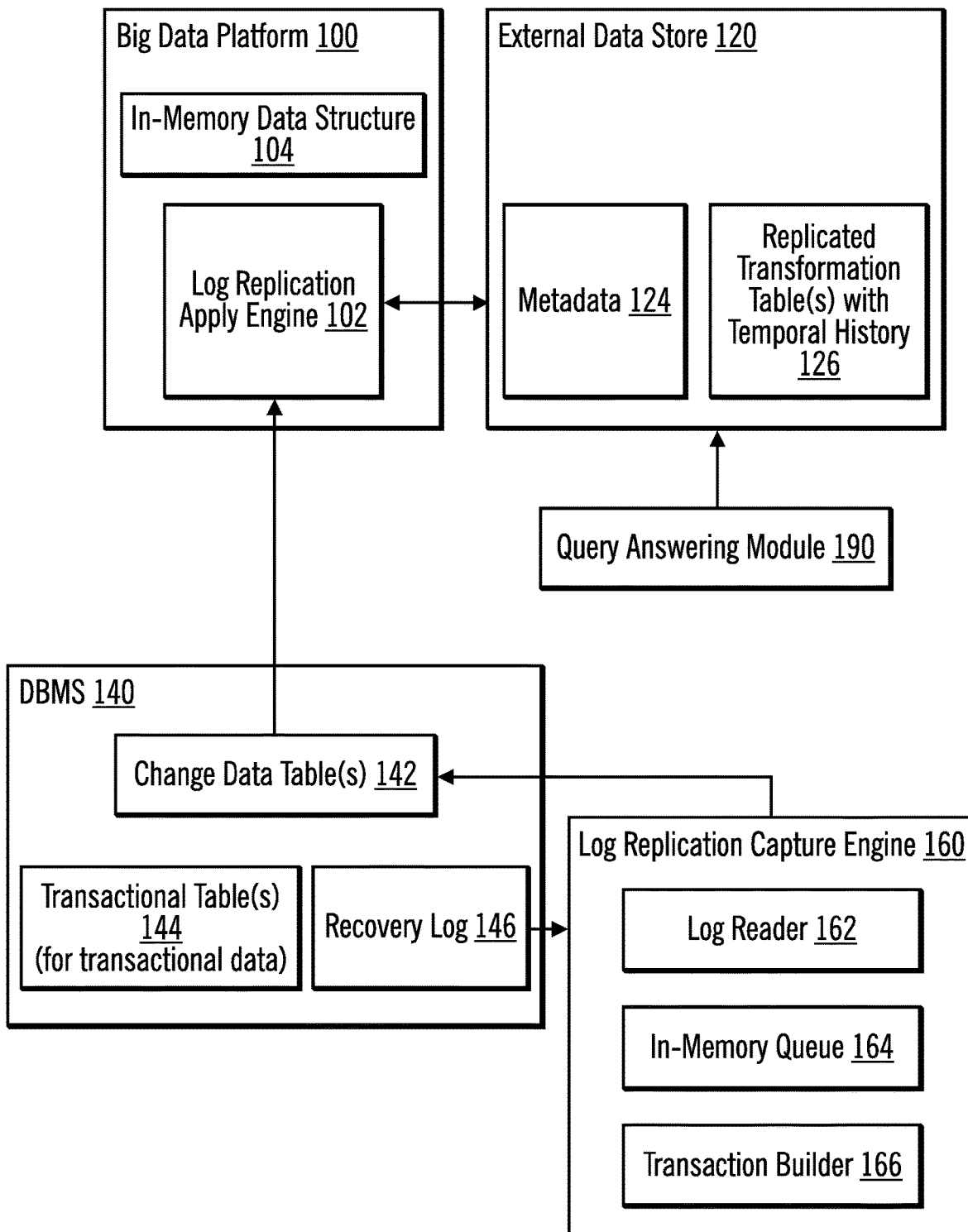
FIG. 1 illustrates, in a block diagram, a computing environment in accordance with certain embodiments.

FIG. 1 illustrates, in a block diagram, a computing environment in accordance with certain embodiments. A big data platform 100 is coupled to an external data store 120 and a Database Management System (DBMS) 140. The big data platform 100 includes a log replication apply engine 102 ("apply engine") and an in-memory data structure 104. The DBMS 140 may be described as a source data store.

The external data store 120 includes metadata 124 and one or more replicated transformation tables with temporal history 126 ("replicated tables" or "replicated transformation tables"). The external data store 120 also is coupled to a query answering module 190, which may issue queries against data stored in the external data store.

The DBMS 140 is coupled to a log replication capture engine 160 ("capture engine"). The DBMS 140 includes one or more change data tables 142, one or more other transactional tables 144, and a recovery log 146 storing transactions. The one or more change data tables 142 may be persistent. The transactional tables 144 store DBMS transactional data (as records or rows). The recovery log 146 may also be referred to as a transaction log and may be persistent.

The capture engine 160 includes a log reader 162, an in-memory queue 164, and a transaction builder 166.

Embodiments introduce replication middleware that includes the apply engine 102 and the capture engine 160. With embodiments, the capture engine 160 may reside in the same system as the DBMS 140. The capture engine 160 is responsible for decoding recovery log entries, rebuilding transactions, and writing committed changes to the change data table 142 in the DBMS 140. With embodiments, there is one change data table 142 defined for each transaction table 144. These change data tables 142 act as data staging buffers that are accessed by both the capture engine 160 and the apply engine 102.

With embodiments, for optimal performance and minimal overhead, the change data tables 142 are defined "NOT LOGGED" and accessed without locking. If the DBMS 140 fails, their content may be recaptured from the persistent recovery log 146.

The apply engine 102 runs parallel jobs (e.g., Hadoop® Spark jobs) to subscribe new log entries in the change data tables 142 via SQL (e.g., Hadoop® Spark SQL) and to build the replicated tables 126. Subscribing the log entries refers to selectively choosing which log entries to receive. In certain embodiments, the selection of log entries may be configured using a filtering parameter. In other embodiments, the selection of log entries may be configured to receive all log entries. With embodiments, there is one replicated table 126 defined for each transaction table 144. In certain embodiments, the replicated tables have a columnar storage format (e.g., an Apache® Parquet® format). (Parquet is a registered trademark of the Apache Software Foundation in the United States and/or other countries.)

Figure 2:
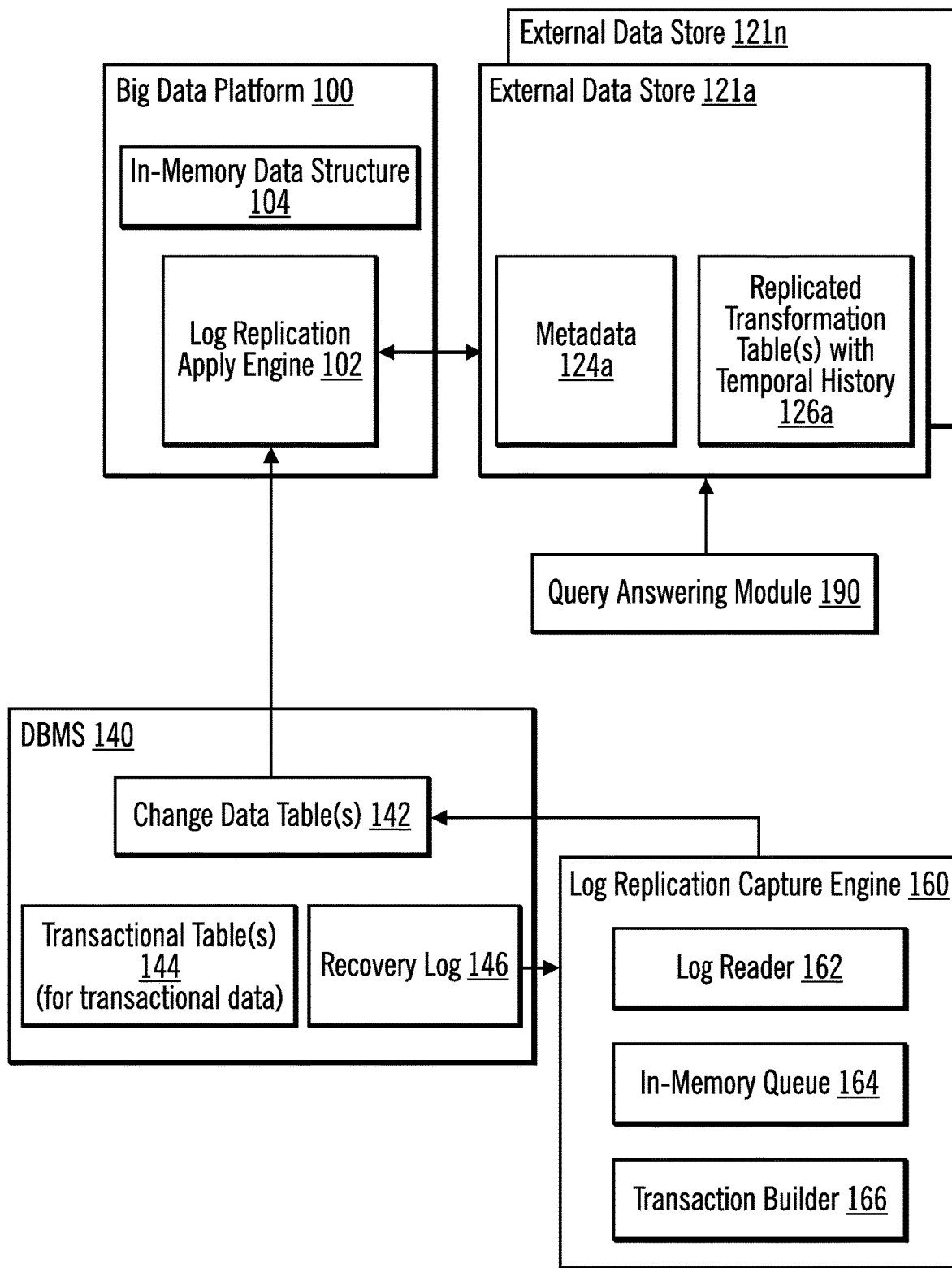
FIG. 2 illustrates, in a block diagram, a computing environment with multiple, external data stores in accordance with certain embodiments.

FIG. 2 illustrates, in a block diagram, a computing environment with multiple, external data stores in accordance with certain embodiments. In FIG. 2, there are multiple external data stores 121a . . . 121n. In certain embodiments, the multiple external data stores 121a . . . 121n may be heterogeneous data stores. In other embodiments, the multiple external data stores 121a . . . 121n may be homogenous data stores. Each of the external data stores 121a . . . 121n includes metadata and one or more replicated transformation tables with temporal history ("replicated tables" or "replicated transformation tables"). For example, the external data store 121a includes metadata 124a and one or more replicated transformation tables with temporal history 126a ("replicated tables" or "replicated transformation tables").

Figure 3:
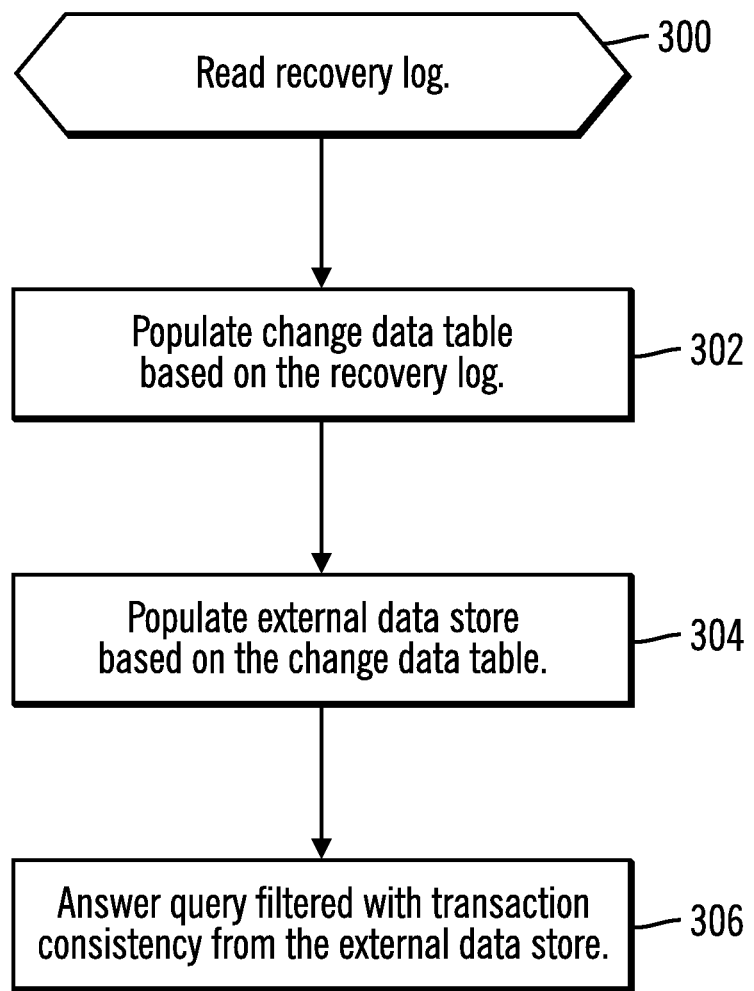
FIG. 3 illustrates, in a flow chart, operations for transaction consistency query support for replicated data from recovery log to external data stores.

FIG. 3 illustrates, in a flow chart, operations for transaction consistency query support for replicated data from recovery log to external data stores. Control begins at block 300 with the capture engine 160 reading the recovery log 146. In block 302, the capture engine 160 populates (i.e., stores data into) the change data table 142 based on the recovery log 146. In block 304, the apply engine 102 populates (i.e., stores data into) one or more replicated tables 126 of the external data store 120 based on the change data table 142. In block 306, the analytics engine 100 answers a query filtered with transaction consistency from the external data store.

Figure 4:
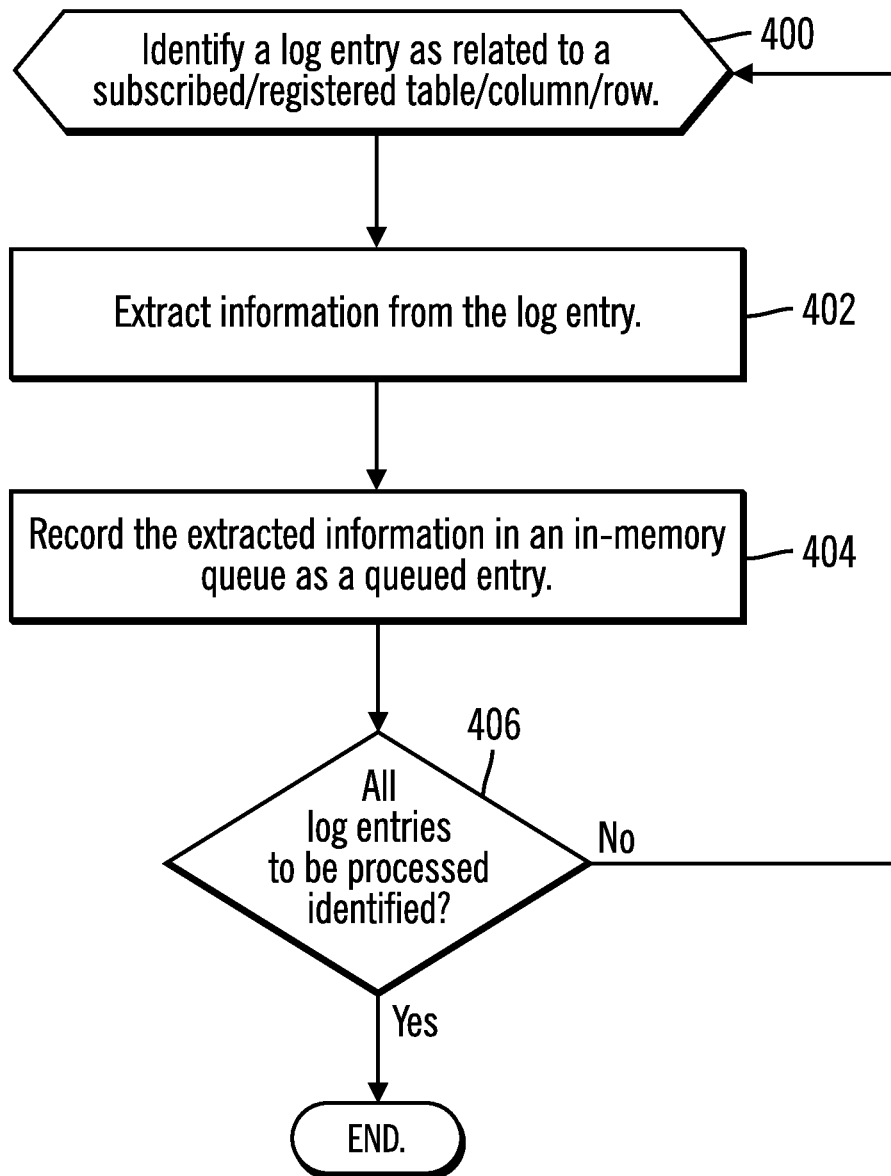
FIG. 4, illustrates, in a flow chart, operations for reading a log entry from a recovery log in accordance with certain embodiments.

FIG. 4, illustrates, in a flow chart, operations for reading a log entry from the recovery log 146 in accordance with certain embodiments. Control begins at block 400 with the capture engine 160 identifying a log entry as related to a subscribed/registered table/column/row. In block 402, the capture engine 160 extracts information from the log entry. In certain embodiments, the information that is extracted is information that needs to be stored at the target data store, as well as, meta data information, such as timestamp, etc. In block 404, the capture engine 160 records the extracted information in an in-memory queue 164 as a queued entry. In certain embodiments, the in-memory queue 164 is an in-memory buffer. In block 406, the capture engine 160 determines whether all log entries to be processed have been identified. If so, processing is done, otherwise, processing loops to block 400.

Figure 5:
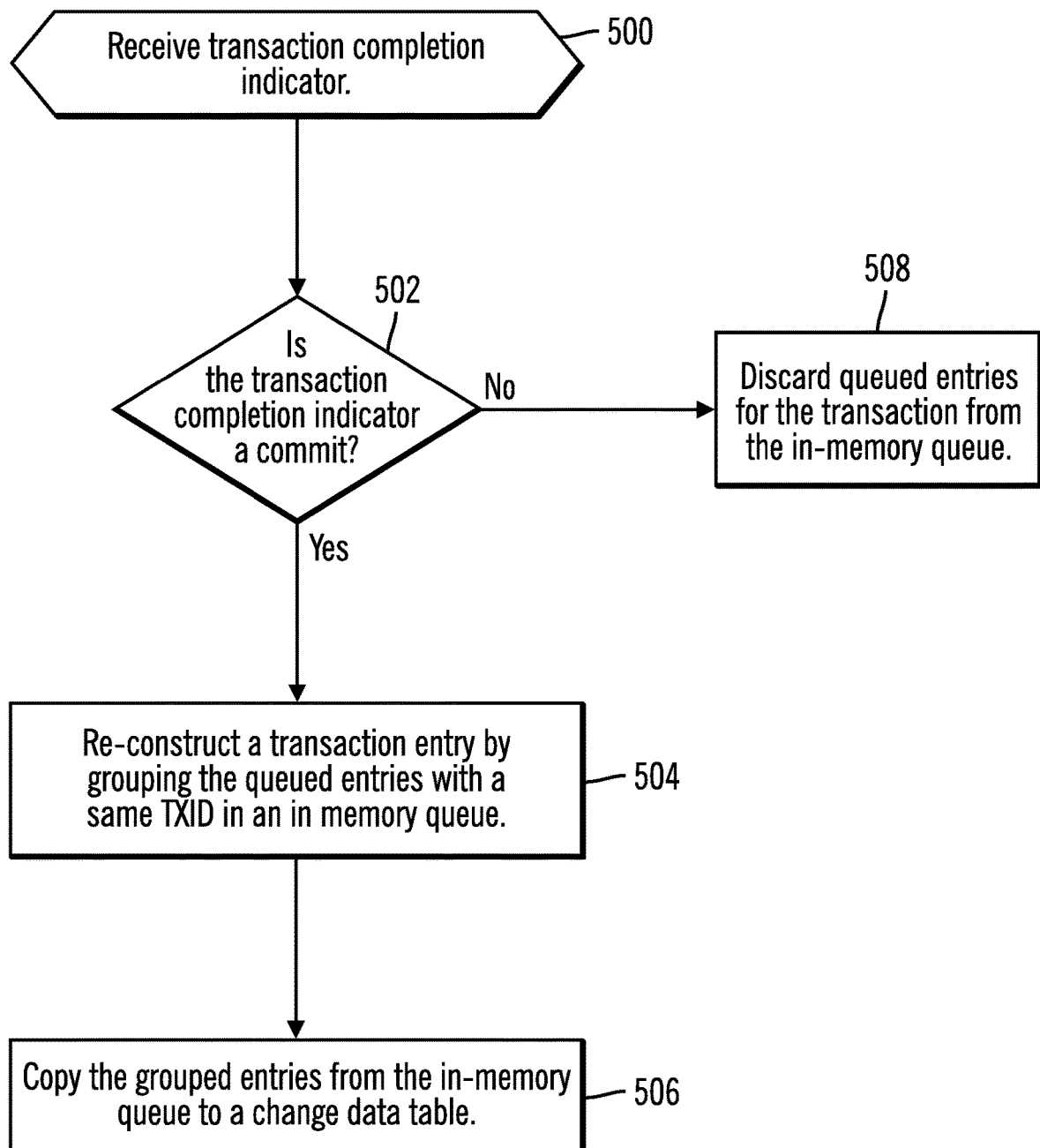
FIG. 5, illustrates, in a flow chart, operations when a transaction completion indicator is received in accordance with certain embodiments.

FIG. 5, illustrates, in a flow chart, operations when a transaction completion indicator is received in accordance with certain embodiments. Control begins at block 500 with the capture engine 160 receiving a transaction completion indicator (which may be commit or abort). In block 502, the capture engine 160 determines whether the transaction completion indicator is a commit. If so, processing continues to block 504, otherwise, processing continues to block 506.

In block 504, the capture engine 160 re-constructs a transaction entry by grouping the queued entries with a same TXID in the in-memory queue 164. In block 506, the capture engine 160 copies the grouped entries from the in-memory queue 164 to the change data table 142.

Processing continues from block 502 to block 508 when the transaction completion indicator is an abort. In block 508, the capture engine 160 discards queued entries for the transaction from the in-memory queue 164.

With embodiments, a log reader 162 sequentially scans the recovery log 146 and examines each log entry in the recovery log 146. A log entry may be described as a data structure that describes what was changed within the transactional tables 144 of the DBMS 140. If the log entry is related to the subscribed/registered tables/columns/rows, the log reader 162 extracts information from the log entry of the recovery log 146 and records that information in the in-memory queue 164.

Each log entry contains the transaction information (e.g., a unique transaction identifier, TXID). All the log entries written by the same transaction contain the same TXID.

The end of a transaction has a Commit or Abort log entry. When seeing an Abort log entry, the queued entries of this transaction are discarded. When seeing a Commit log entry, the transaction builder 166 re-constructs a transaction by grouping the records with the same TXID. The transaction is composed of a list of records whose sequence is the same as the ones in the recovery log.

The re-constructed transaction entries are inserted into an in-memory queue 164, transQ, which is a non-persistent staging area.

In certain embodiments, the information of each re-constructed transaction log entry includes:

Sequence Identifier (SID): a globally densely incrementing sequence identifier (SID) generated by the transaction builder 166. It starts with zero for the first queued record in the first built transaction entry and increments by one for each subsequent queued record processed by the transaction builder 166. Thus, the assigned SID numbers of the records within the same transaction are consecutive.

Log Sequence Number (LSN): a sequence number that uniquely identifies a change in the recovery log. This value is globally ascending.

Transaction Identifier (TXID): a sequence number that provides transactional order. This is also extracted from the log entry.

Last Message of Transaction (LAST_MSG_TX): a flag to show if this message is the last message (queued record) of the entire transaction. This value is assigned by the transaction builder 166 for the last queued record grouped into a transaction. This may be referred to as a last transaction message indicator.

Commit time (COMMIT_TIME): the transaction commit timestamp. This is extracted from the log entry.

Operation (OP): A flag that indicates the type of operation for a record. With embodiments, the following indicators are used for the flag: I for insert; U for update; and D for delete.

user-column-after-image ("after-image"): Each source column has a corresponding after-image column. In most cases, the after-image contains the value that is in the source column after the change occurs. This value has the same name, data type, and null attributes as the source column. In certain embodiments, in the case of an update, this value reflects the new value of the data that was updated. In certain embodiments, in the case of a delete, the after-image column is null. In certain embodiments, in the case of an insert, the after-image column reflects the value of the data that was inserted.

user-column-before-image ("before-image"): Each source column has a corresponding before-image column. In most cases, the before-image column contains the value that was in the source column before the change occurred. This value has the same name, data type, and null attributes as the source column. In certain embodiments, in the case of an update, the before-image column reflects the data that was updated. In certain embodiments, in the case of a delete, the before-image column reflects the data that was deleted. In certain embodiments, in the case of an insert, the before-image column is null.

Cyclic Redundancy Check (CRC): the checksum of the whole record, which may be referred to as a data loss indicator.

Embodiments provide new attribute fields of: SID, LAST_MSG_TX, and CRC. With embodiments, SID and CRC are used to detect the data loss and corruption; SID and LAST_MSG_TX are used to determine which records are part of in-flight transactions in the external data store; and SID and COMMIT_TIME are used to determine the source commit time for which all transactions to that point have been inserted to the target. With embodiments, the SID, LAST_MSG_TX, and CRC are generated by transaction builder 166. An "in-flight" transaction is a transaction that has been started, but not committed yet.

Populating the external data store includes moving log entries recorded in the in-memory queue 164 and storing them into the external data store 120 (target). The external data store 120 may be described as a history/versioning data store that records the data change histories in the replicated tables 126 that are captured from the recovery log 146. For example, for a bank account, for a particular account holder, the transactional table 144 may show that the account holder has $0. However, the replicated table 126 may show the history of the account holder having $500, adding $500 (and having $1000), and withdrawing $1000 (and having $0).

In certain embodiments, data transmission from the source transactional tables 144 to the target external data store 120 may be completed without extra staging media. In another embodiment, a persistence queue/media is used for staging between source and target (e.g., DBMS tables or a messaging queue). In certain embodiments, the target external data store 120 may be a key-value data store, and duplicate keys are allowed. In other embodiments, the external data store 120 supports versioning.

In certain embodiments, the external data store 120 is a big, distributed, persistent, fault-tolerant hash table. In certain embodiments, the external data store 120 is a Hadoop® Distributed File System (HDFS). (Hadoop is a registered trademark of the Apache Software Foundation in the United States and/or other countries.) The HDFS may be described as a distributed, scalable, and portable file-system. In other embodiments, the external data store 120 is an object store over HDFS. In certain embodiments, the big data platform 100 is a Hadoop® Spark platform.

In certain embodiments, the publishing is a push model, in which the DBMS 140 pushes records from the change data table 142 to the target external data store 120. In another embodiment, the publishing is a pull model, in which the target external data store 120 pulls records from the change data table 142 of the DBMS 140. The change data table 142 may be a persistence queue or a messaging queue.

In certain embodiments, the push model uses the Representational State (REST) Application Programming Interfaces (APIs) provided by the external data store 120.

When using a key-value external data store with versioning, the key consists of: 1) a replication key schema name and 2) a table name (and/or database name). The replication key may be the source-side table key. Alternatively, the replication key may be an internal row identifier inside the DBMS 140 or any other unique value.

In certain embodiments, each record includes values for: SID, LSN, TXID, LAST_MSG_TX, COMMIT_TIME, OP, after-image, before-image, and CRC. In other embodiments, the record does not include all of these values (e.g., does not include the before-image).

In certain embodiments, the technologies of REST APIs plus resource and session management (between DBMS 140 and big data platform 100) provide atomic and persistent operations. Resource management refers to management of resources, such as managing hardware resources (e.g., CPU, memory, etc.) and software resources (e.g., number of database instances, connections among databases, etc.). Session refers to a way that operation state is maintained, if it is stateful. For example, these technologies provide the commit operation, which can guarantee an object being written to a finalized object. Once this commit operation succeeds, a container (between DBMS 140 and big data platform 100) guarantees that the object is available for reading.

The data movements from the DBMS 140 to the external data store 120 may be done with sequential publishing or parallel publishing. With sequential publishing, one publisher thread reads the in-memory queue 164 and publish it to the remote external data store 120.

With parallel publishing, multiple publisher threads are consuming the same in-memory queue 164. With parallel publishing, there is transaction-level parallelism and record-level parallelism. With transaction-level parallelism, each message in the in-memory queue 164 corresponds to a single transaction, each transaction in in-memory queue 164 is published by one and only one thread, and the publishing order may be different from the original transaction commit orders. With record-level parallelism, each message in the in-memory queue 164 corresponds to a single record of a transaction, each record is published by one and only one thread, and the publishing order may be different from the original data change orders. With embodiments, the parallelism of publishing is configurable. In certain embodiments, the parallelism of publishing may be specified by users. In certain embodiments, parallelism of publishing may be adjusted by the capture engine 160.

Figure 6:
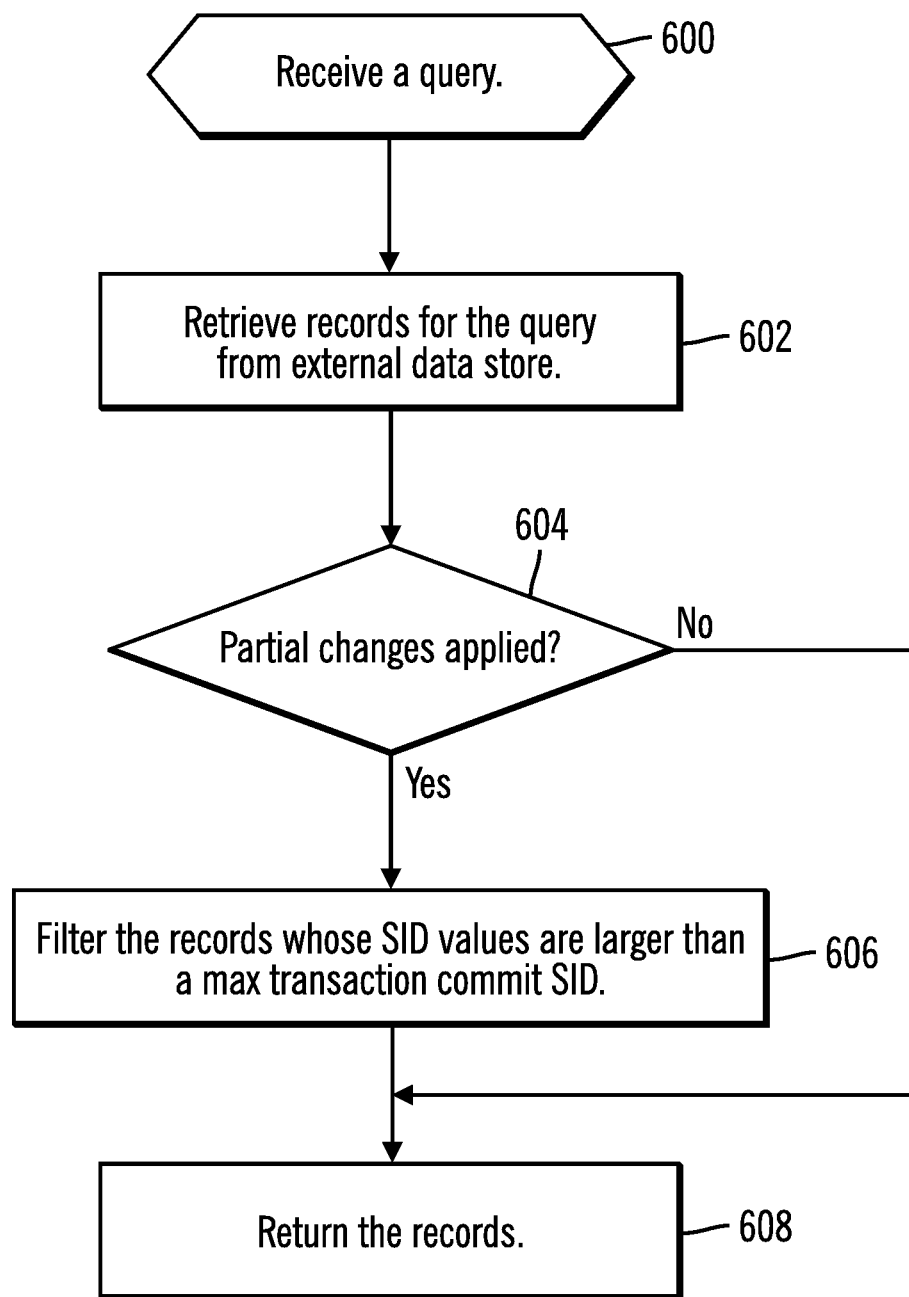
FIG. 6 illustrates, in a flow chart, query answering filtered with transaction consistency from an external data store in accordance with certain embodiments.

FIG. 6 illustrates, in a flow chart, query answering filtered with transaction consistency from the external data store 120 in accordance with certain embodiments. Control begins at block 600 with the log replication apply engine 102 receiving a query. In block 602, the log replication apply engine 102 retrieves records for the query from the external data store 120. In block 604, the log replication apply engine 102 determines whether partial changes have been applied. If so, processing continues to block 606, otherwise, processing continues to block 608.

In block 606, the log replication apply engine 102 filters the records whose SID values are larger than a maximum transaction commit SID ("maximum value") to provide transaction consistency. In block 608, the log replication apply engine 102 returns the records.

Since the data changes from the recovery log 146 to the external data store 120 are always active, the query answering module 190 needs to know which applied/inserted data changes are part of in-flight transactions whose changes have not been completed. That means, partial changes may not be inserted into the external data store 120 or may be invisible to the queries. These changes in in-flight transactions should not be returned to users.

Embodiments provide option-1 and option-2.

With option-1, a partial change is not visible to queries event though they are applied as they arrive. Embodiments introduce a maximum transaction-commit SID, max_tx_commit_sid. The records in the in-flight transactions have larger SID values than max_tx_commit_sid. The returned query results filter out the records or the associated results whose SID values are larger than the max_tx_commit_sid.

Under option-1, with sequential publishing, the publishing sequence is the same as the message sequence in in-memory queue 164. When hitting the last message of a transaction, embodiments update max_tx_commit_sid to the SID of the last message.

Under option-1, with parallel publishing, the records and the associated transactions are published and completed in any order. Thus, embodiments provide an automatic technique to maintain max_tx_commit_sid. In certain embodiments, another variable maximum applied SID, a maximum applied SID (max_applied_sid) is maintained at the same time. Then, max_applied_sid is the SID value for which all messages to that point have been applied to the external data store 120. In other embodiments, an in-memory data structure is used to store the SID whose value is larger than max_applied_sid. The SIDs are stored in a sorted order or the data structure itself provides the order (such as "min heap"). Each element in the data structure stores a value of SID and a flag LAST_MSG_TX to indicate if this is the last message of a transaction. In yet other embodiments, max_applied_sid and max_tx_commit_sid are stored in both memory and a persistent media.

With option-1, with parallel publishing, when a new record is inserted into the external data store 120, the SID of the new record is compared with max_applied_sid. If the value is not equal to max_applied_sid+1, the new record is inserted into the data structure, while preserving the order of SIDs in the data structure. If the value is equal to max_applied_sid+1, this SID value replaces the existing max_applied_sid. If the current message is the last message of the transaction, max_tx_commit_sid is updated to this new SID value. Furthermore, consecutive SIDs in the data structure immediately following the new max_applied_sid are also removed from the data structure, and the SID of the last removed entry is the new max_applied_sid. When the value of max_applied_sid is updated, max_tx_commit_sid is the last consecutive applied SID with LAST_MSG_TX.

With option-1, with parallel publishing, for "min heap" as the data structure, embodiments enter the checking loop to check if the max_applied_sid is the same as the root's SID value (the min applied nonconsecutive SID)−1. If not equal, embodiments break the loop and check the next message. Otherwise, embodiments 1) replace the existing max_applied_sid by max_applied_sid+1, 2) if it is the last message of a transaction, max_tx_commit_sid is updated to max_applied_sid+1, 3) remove the root node, 4) continue the checking loop using the new root of min heap.

With option-2, partial changes are not applied. With embodiments, the data structure also holds the to be applied changes, unless they are consecutive, following immediately after max_applied_sid. When LAST_MSG_TX is seen, then the entire group of captured records in the same transaction are applied. In the case in which the data structure in memory cannot hold the arrived records any more in memory, those records with higher SID in the data structure are overflown to disk.

In both option-1 and option-2, in the case when some records fail to arrive at the external data store 120, these records are retrieved from the DBMS 140. If only a few records are lost or corrupted, embodiments can send messages back to the capture engine 160 to re-capture the few records from the recovery log 156. One more attribute, max_applied_lsn, may be used for the capture engine 160 to find the eligible/subscribed records just after this LSN. When many records are missing, the target external data store 120 deletes the appended rows whose SIDs are after max_tx_commit_sid; and the source DBMS 140 drops all rows in the in-memory queue 164 and restarts reading the recover log 146 from max_applied_lsn.

In both option-1 and option-2, when generation of the message sequence identifier SID is reset, the target external data store 120 deletes records. To avoid data loss and data corruption: when SID is always consecutive, no message is lost. Also, when the CRC is calculated at the target external data store 120, if the CRC matches the source-side value, there is no data corruption.

Figure 7:
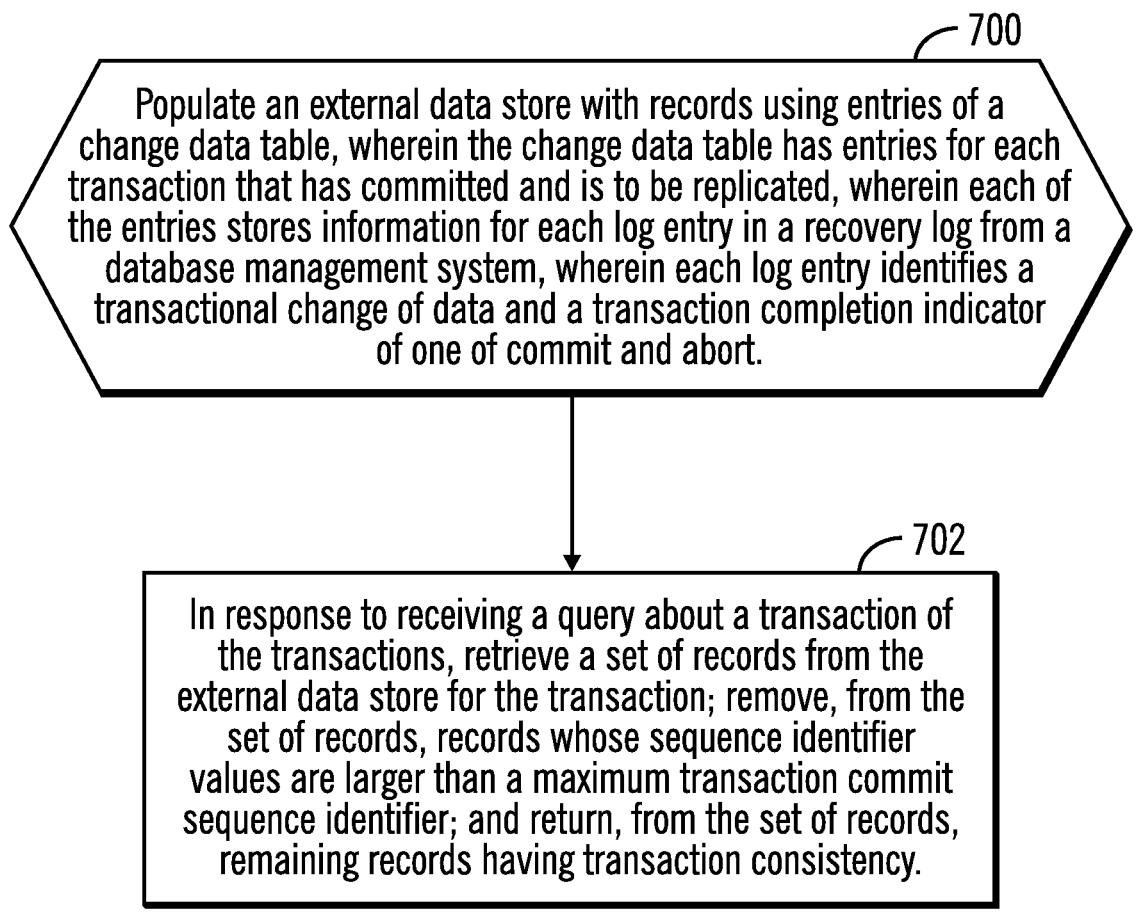
FIG. 7 illustrates, in a flow chart operations for responding to a query with transaction consistency in accordance with certain embodiments.

FIG. 7 illustrates, in a flow chart operations for responding to a query with transaction consistency in accordance with certain embodiments. Control begins at block 700 with populating an external data store with records using entries of a change data table, wherein the change data table has entries for each transaction that has committed and is to be replicated, wherein each of the entries stores information for each log entry of log entries in a recovery log from a DBMS, wherein each of the log entries identifies a transactional change of data and a transaction completion indicator of one of commit and abort. In block 702, in response to receiving a query about a transaction of the transactions, a set of records from the external data store are retrieved for the transaction; from the set of records, records whose sequence identifier values are larger than a maximum transaction commit sequence identifier are removed; and from the set of records, remaining records are returned having transaction consistency.

Embodiments provide a query capability with the same recorded transaction consistency at the target external data store 120 as is available at the source DBMS 140, especially for the applications that are unable to tolerate a dirty read. Thus, embodiments are able to recover the transaction consistency when answering queries at the target external data store 120.

Embodiments enable a data store external to a DBMS to efficiently retrieve information recorded in the transaction recovery log of the DBMS with the same recorded transaction consistency.

Big data platforms, such as the Apache® Hadoop® platform and the Apache® Spark platform, enable analytics on data processed with a DBMS. (Apache and Hadoop are registered trademarks of the Apache Software Foundation in the United States and/or other countries.) A recovery log captures the change history of the DBMS transactional data.

With embodiments, the recovery log is available on big data platforms, and the decoded recovery log may be used for history trend analysis, compliance monitoring, online fraud detection, online preference recommendation, transaction hot-spot identification, query-able data archive of DBMS, data access pattern correlation, credit investigation, online DBMS data exploration and visualization, etc. Embodiments provide highly scalable data replication from a DBMS recovery log to the big data platforms for data retrieval exploited by advanced analysis and analytics exploration.

Embodiments allow queries to return data from a target external data store that is consistent based on in-flight replication of source updates that are being applied in multiple independent transactions. With embodiments, the source unit of work (or unit of recovery) is not applied at the target external data source 120 in an atomic operation, and this allows queries to ignore the parts that have already been applied for source UORs that are still being processed. Embodiments provide performance enhancement, compared with the conventional solutions. Source UOR/transactions are split into multiple independent table-specific replication channels. In the target side, the replication channels are applied in parallel, and the changes in each channel can also be replayed in parallel for better performance. The performance gains are more obvious when the target systems are append-only file systems (like HDFS). For better performance, each row-specific change may be applied in a non-atomic way in the target external data store 120. For target-side queries, the source-side transaction consistency is recovered.

Based on the observation that transaction consistency is relevant when data is queried, embodiments introduce a new way for lazy database replication without sacrificing transaction consistency, replay parallelism/performance in the target system. Embodiments are more feasible when the target system is big-data processing platforms, which are based on append-only files. All the changes captured in the source database append on the files in the target database without negative performance impacts by dependency checking and throttling. Transaction consistency is recovered when a query is answered. All the inconsistent data (including both out-of-order replays and partial replays) are filtered out by the target system by using the transaction commit identifiers generated in the source database. Thus, embodiments maximize the transaction replay parallelism in the target database without compromising the integrity of the data. Embodiments require significantly less overhead than conventional approaches. More importantly, it is easily adaptable to various types of big data processing systems when replicating data from traditional databases. Another advantage is this approach off-loads computations cost at source database side which very often is resource constrained.

Embodiments provide a synchronized and consistent query result from an unsynchronized parallel store of data. This allows fully deterministic queries more commonly done on a dedicated DBMS to be performed on other scalable programming environments. Embodiments provide the ability for clients to leverage newer analytics engines, without compromising the deterministic query behavior they are familiar with from a DBMS. With embodiments, multiple processing streams are used to deal with the source data value, which means that embodiments be used by large enterprises.

Embodiments are directed to transaction consistency query support for replicated data from DBMS recovery log to external data stores comprising: receiving a recovery log from a database management system (DBMS) identifying one or more transactional changes of data comprising CRUD operations of records and transaction completion [commit or abort] by a system remote to the DBMS; replaying the recovery log in the system by inserting data from the records into an in memory data structure tracking a summarization of transaction entries comprising a status of commit, abort, and in-process; and responsive to receiving a request for information about a transaction from a requestor, utilizing the summarization of transaction entries to return the information to the requestor.

In certain embodiments, the summarization of transaction entries include a sequence number, a log sequence number, a transaction identifier, a last transaction message indicator, a commit time, and a data loss indictor. In certain embodiments, the returned information contains records for committed transactions. In certain embodiments, the returned information permits returning non-committed data for queries that do not need consistent data. In certain embodiments, the returned information contains completed data. In certain embodiments, the returned information contains partial data.

Figure 8:
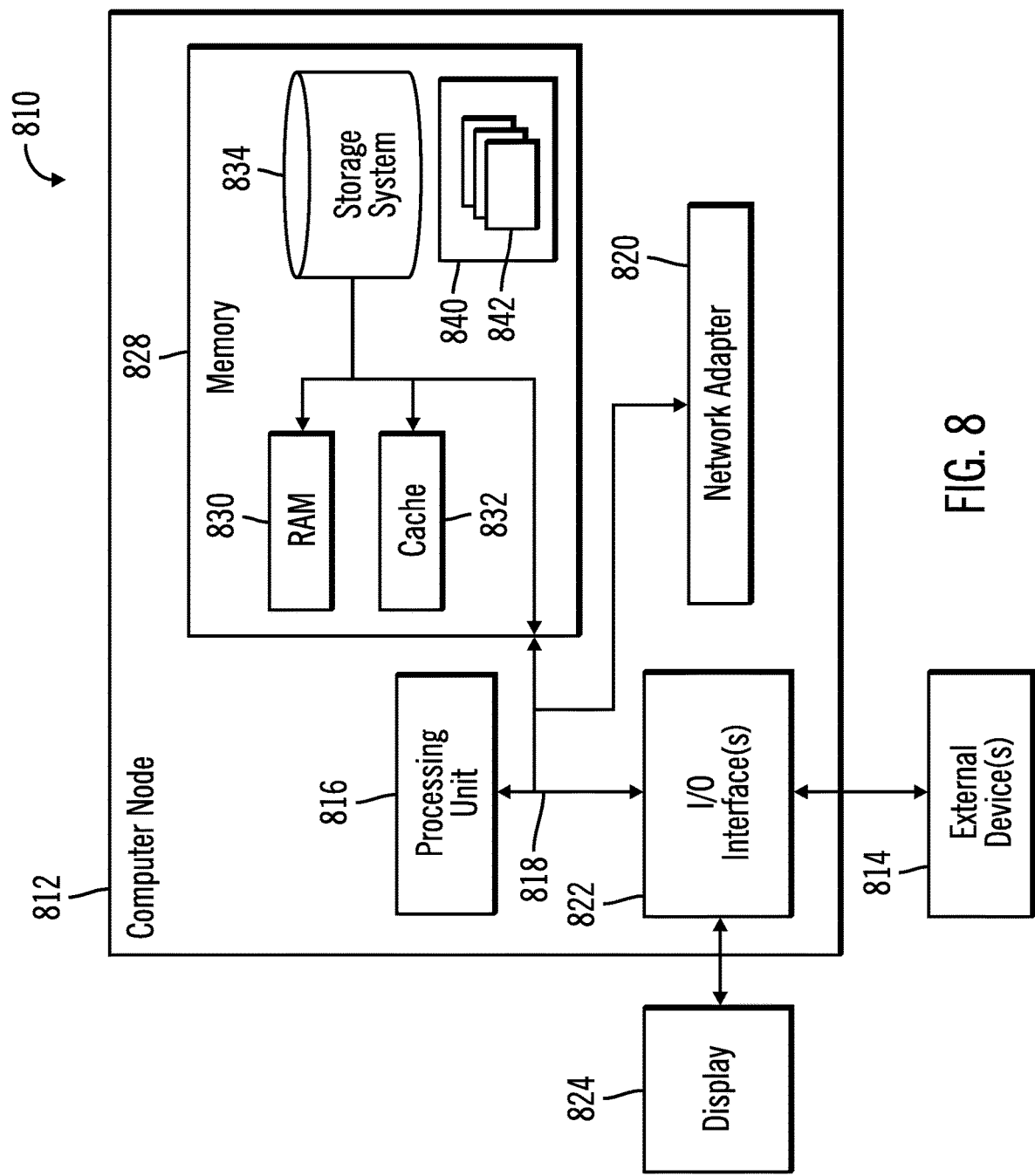
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 in cloud computing node 810 is shown in the form of a general-purpose computing device. The components of computer node 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the big data platform 100, the external data store 120, and/or the DBMS 140 have the architecture of computer node 812. In certain embodiments, the big data platform 100, the external data store 120, and/or the DBMS 140 are part of a cloud environment. In certain alternative embodiments, the big data platform 100, the external data store 120, and/or the DBMS 140 are not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
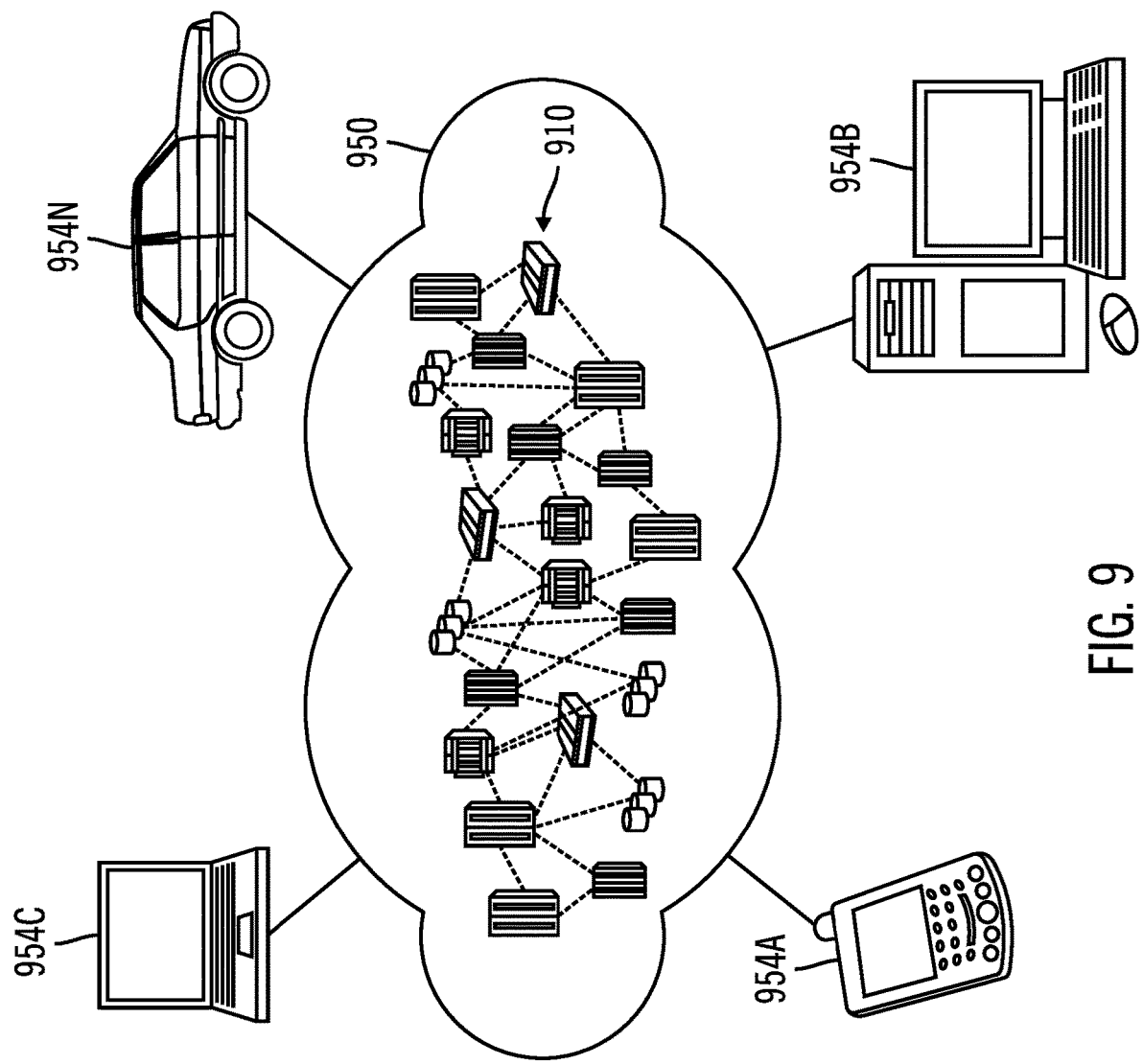
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
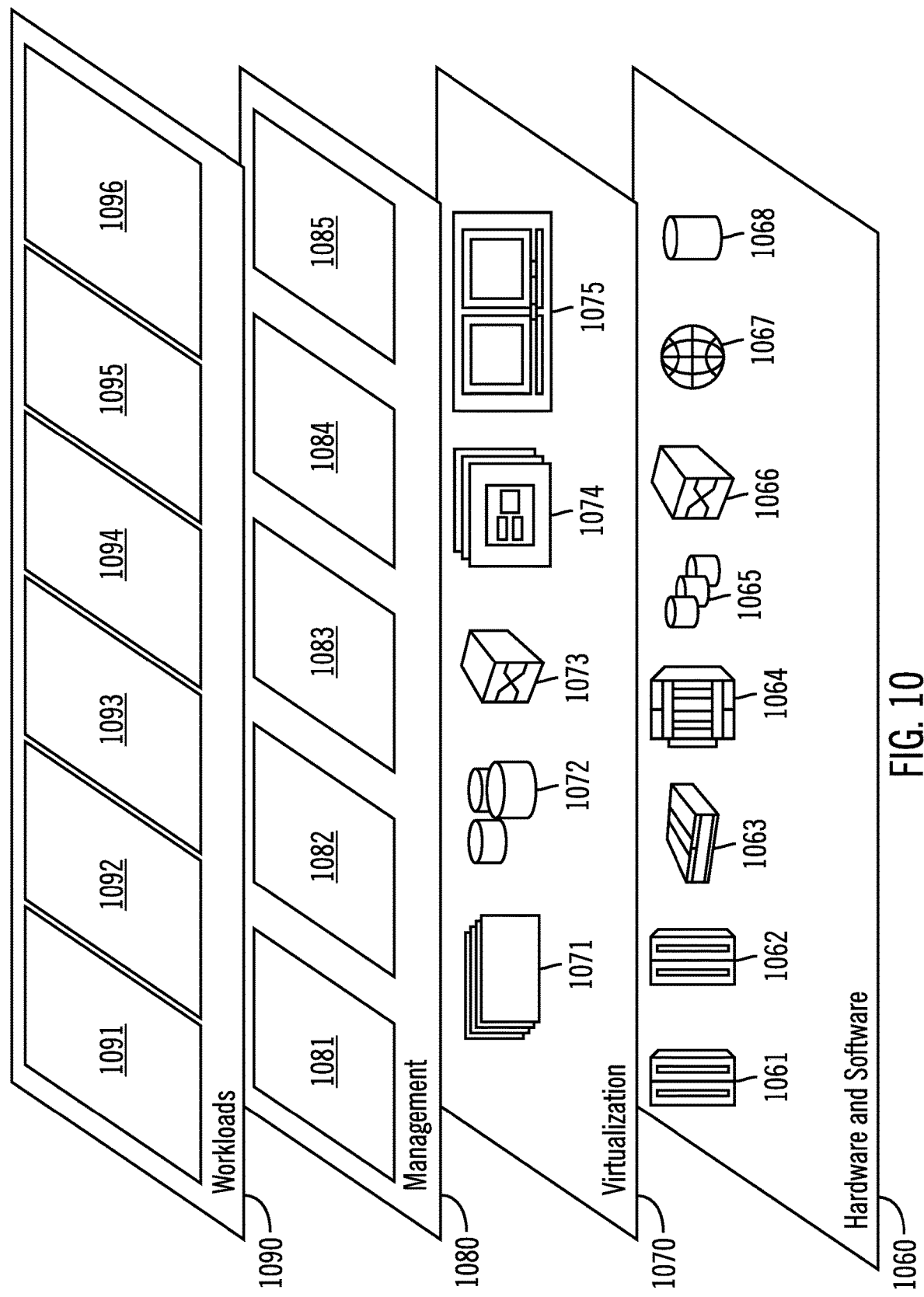
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and query processing with transaction consistency 1096.

Thus, in certain embodiments, software or a program, implementing query processing with transaction consistency in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product for transaction consistency query support for replicated data from a recovery log to an external data store and comprising a computer readable storage medium having program code embodied therewith, the program code executable by at least one processor to perform operations for:

populating a replicated transformation table in an external data store with records using entries of a change data table in a database management system, by:
with sequential publishing, for each of the entries:
determining whether that entry is a last entry for a transaction by checking a last transaction message indicator; and
in response to determining that the entry is the last entry for the transaction, setting a maximum transaction commit sequence identifier value for the transaction to a sequence identifier of the last entry; and
with parallel publishing, for each of the entries,
determining whether that entry is the last entry for the transaction by checking the last transaction message indicator; and
in response to determining that the entry is the last entry for the transaction, setting a maximum transaction commit sequence identifier value to a last consecutive applied sequence identifier; and
in response to receiving a query at the external data store,
retrieving a set of records from the replicated transformation table in the external data store;
determining whether partial changes have been applied, wherein the partial changes are in records of in-flight transactions that have not committed yet in the external data store;
in response to determining that the partial changes have been applied,
removing, from the set of records, the records of the in-flight transactions whose sequence identifier values are larger than the maximum transaction commit sequence identifier value; and
returning, from the set of records, remaining records having transaction consistency; and
in response to determining that the partial changes have not been applied, returning the set of records having transaction consistency.

2. The computer program product of claim 1, wherein, in response to receiving an abort transaction completion indicator, discarding the entries for the transaction from an in-memory queue.

3. The computer program product of claim 1, wherein the remaining records contain records for committed transactions and do not contain records for the in-flight transactions.

4. The computer program product of claim 1, wherein information from a log entry includes a sequence identifier, a commit time, and a data loss indictor, wherein the sequence identifier and the commit time are used to determine a source commit time for which transactions to that point have been inserted into the external data store, and wherein the sequence identifier and the data loss indicator are used to detect data loss and corruption.

5. The computer program product of claim 1, wherein a Software as a Service (SaaS) is configured to perform the operations of the computer program product.

6. The computer program product of claim 1, wherein the change data table is populated by:
storing information from log entries of a recovery log into entries of an in-memory queue;

in response to receiving a commit transaction completion indicator, reconstructing a transaction by grouping entries of the in-memory queue that have a same transaction identifier; and storing the grouped entries for the reconstructed transaction in the change data table.

7. A computer system for transaction consistency query support for replicated data from a recovery log to an external data store, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

populating a replicated transformation table in an external data store with records using entries of a change data table in a database management system by:

with sequential publishing, for each of the entries:
determining whether that entry is a last entry for a transaction by checking a last transaction message indicator; and
in response to determining that the entry is the last entry for the transaction, setting a maximum transaction commit sequence identifier value for the transaction to a sequence identifier of the last entry; and with parallel publishing, for each of the entries,
determining whether that entry is the last entry for the transaction by checking the last transaction message indicator; and
in response to determining that the entry is the last entry for the transaction, setting a maximum transaction commit sequence identifier value to a last consecutive applied sequence identifier; and in response to receiving a query at the external data store,
retrieving a set of records from the replicated transformation table in the external data store;
determining whether partial changes have been applied, wherein the partial changes are in records of in-flight transactions that have not committed yet in the external data store;

in response to determining that the partial changes have been applied,
removing, from the set of records, the records of the in-flight transactions whose sequence identifier values are larger than the maximum transaction commit sequence identifier value; and
returning, from the set of records, remaining records having transaction consistency; and in response to determining that the partial changes have not been applied, returning the set of records having transaction consistency.

8. The computer system of claim 7, wherein, in response to receiving an abort transaction completion indicator, discarding the entries for the transaction from an in-memory queue.

9. The computer system of claim 7, wherein the remaining records contain records for committed transactions and do not contain records for the in-flight transactions.

10. The computer system of claim 7, wherein a Software as a Service (SaaS) is configured to perform the operations of the computer system.

11. The computer system of claim 7, wherein information from a log entry includes a sequence identifier, a commit time, and a data loss indictor, wherein the sequence identifier and the commit time are used to determine a source commit time for which transactions to that point have been inserted into the external data store, and wherein the sequence identifier and the data loss indicator are used to detect data loss and corruption.

12. The computer system of claim 7, wherein the change data table is populated by:

storing information from log entries of a recovery log into entries of an in-memory queue;

in response to receiving a commit transaction completion indicator, reconstructing a transaction by grouping entries of the in-memory queue that have a same transaction identifier; and storing the grouped entries for the reconstructed transaction in the change data table.

* * * * *